United States Patent [19]
Kim et al.

Patent Number: 5,987,212
Date of Patent: *Nov. 16, 1999

[54] VARIABLE-SPEED RECORDING AND REPRODUCING METHOD FOR DIGITAL VCR, USING TRICK PLAY DATA

[75] Inventors: Seung Il Kim; Choon Lee; Ki Dong Lee; Ho Won Lee, all of Seoul, Rep. of Korea

[73] Assignee: Goldstar Co., Ltd., Seoul, Rep. of Korea

[*] Notice: This patent issued on a continued prosecution application filed under 37 CFR 1.53(d), and is subject to the twenty year patent term provisions of 35 U.S.C. 154(a)(2).

[21] Appl. No.: 08/343,194

[22] Filed: Nov. 22, 1994

[30] Foreign Application Priority Data

Jul. 18, 1994 [KR] Rep. of Korea ............. 94-17315

[51] Int. Cl.⁶ ............................................. H04N 5/783
[52] U.S. Cl. ............................... 386/68; 386/81
[58] Field of Search ................... 358/335, 312; 360/33.1, 10.1, 32, 48; 386/111, 112, 123, 124, 68, 81, 122, 109; H04N 5/783

[56] References Cited

U.S. PATENT DOCUMENTS

| | | |
|---|---|---|
| 4,931,879 | 6/1990 | Koga et al. ............. 358/335 |
| 5,140,437 | 8/1992 | Yonemitsu ............. 358/342 |
| 5,377,051 | 12/1994 | Lane et al. ............. 360/33.1 |
| 5,400,186 | 3/1995 | Inoue et al. ............. 358/336 |
| 5,448,373 | 9/1995 | Kim ............. 358/342 |
| 5,486,931 | 1/1996 | Kim et al. ............. 386/124 |
| 5,512,957 | 4/1996 | Hulyalkar ............. 348/607 |
| 5,543,932 | 8/1996 | Chang et al. ............. 386/111 |
| 5,546,244 | 8/1996 | Park et al. ............. 386/124 |
| 5,566,174 | 10/1996 | Sato et al. ............. 386/96 |
| 5,587,789 | 12/1996 | Lee et al. ............. 386/68 |
| 5,587,806 | 12/1996 | Yamada et al. ............. 386/68 |
| 5,596,581 | 1/1997 | Saejis et al. ............. 386/104 |

OTHER PUBLICATIONS

"Fast Scan Technology For Digital Video Tape Recorder" by Jill Boyce and Lane, IEEE, No. 3, New York, Aug. 1993.

Primary Examiner—Huy Nguyen
Attorney, Agent, or Firm—John P. White; Cooper & Dunham LLP

[57] ABSTRACT

A variable-speed reproducing method for DVCR comprising the steps of: (1) converting a transported signal into a transport stream (TS) signal; (2) storing the converted TS signal as normal play data; (3) detecting trick play data from the converted TS signal; (4) separately recording the trick play data and normal play data formed in the steps 2 and 3; and (5 and 6) if a trick play signal is input, reading and reproducing only the recorded trick play data at a corresponding speed, thereby facilitating trick play by DVCR.

1 Claim, 8 Drawing Sheets

VARIABLE-SPEED RECORDING AND REPRODUCING METHOD FOR DIGITAL VCR, USING TRICK PLAY DATA

BACKGROUND OF THE INVENTION

The present invention relates to a variable-speed reproducing method for a digital video cassette recorder (DVCR) for recording a transmitted ATV signal on tape and variable-speed reproducing and normal-speed reproducing the recorded signal.

Figure 1:
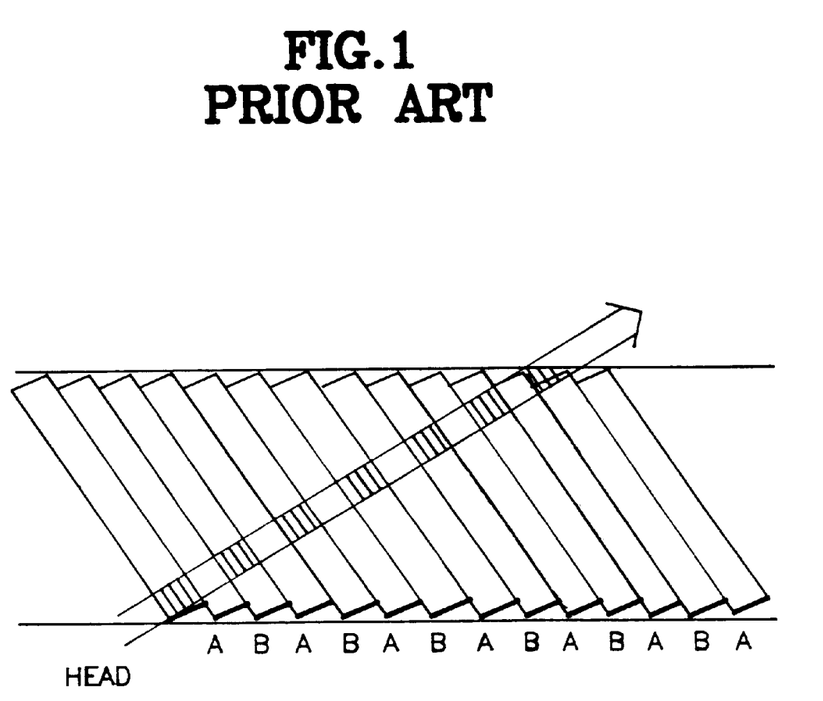
FIG. 1 illustrates a tracking path of a general head.

Generally, if a compressed ATV signal is recorded on a tape of ¼", as shown in FIG. 1, it is very hard to variable-speed reproduce the compressed ATV signal because a location in a track and the amount thereof which a head reads vary in accordance with different speeds in variable-speed playback.

In a conventional technology, there is a method for loading data useful in variable-speed playback only on a common area out of locations where a head traces along tracks in different speeds. There is another method for loading data useful in variable-speed playback on a location where the head traces along a track in respective speeds. However, in the first method, the common area is so small that the data to load should be reduced, resulting in bad picture quality. In the second method, the data should be loaded on a predetermined location in accordance with speeds, resulting in difficult and complicated tracking by the head.

SUMMARY OF THE INVENTION

Therefore, it is an object of the present invention to provide a variable-speed reproducing method for DVCR in which trick play data for trick play and normal playback data for normal-speed playback are separately recorded to facilitate variable-speed playback and normal-speed playback.

To accomplish the object of the present invention, there is provided a variable-speed reproducing method for DVCR comprising the steps of: demodulating a transported ATV signal in a receiver and converting it into a transport stream (TS) signal; receiving the converted TS signal via an interface and storing it as normal play data; detecting trick play data from the converted TS signal; separately recording the trick play data and normal play data formed in the normal play data storing step and trick play data detecting step; and if a trick play signal is input, reading and reproducing only the recorded trick play data at a corresponding speed.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 2:
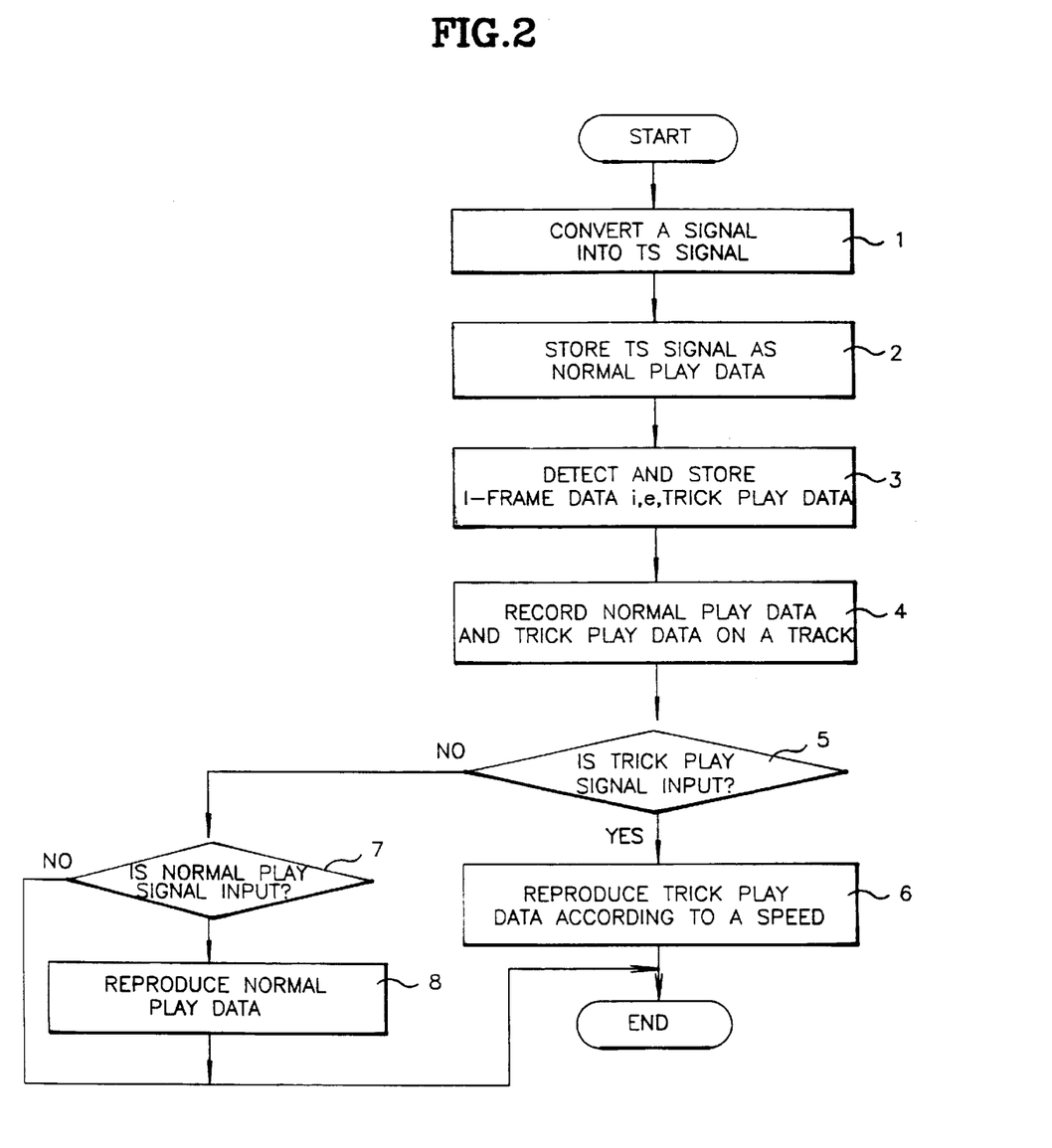
FIG. 2 is a flowchart of a variable-speed reproducing method of the present invention.

Referring to FIG. 2, in step 1, a transmitted ATV signal is demodulated and decoded in a receiver so that it is converted to a transport stream signal which has a bandwidth of 19.3 Mbps and is transmitted in units of 188-byte packets.

Figure 3:
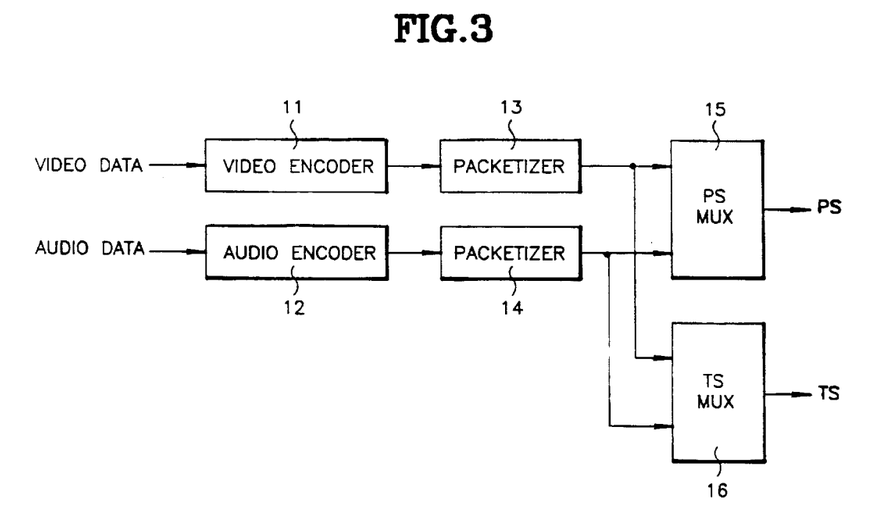
FIG. 3 is a diagram of a transmission port for an ATV signal transmission.

As shown in FIG. 3, for the transport of the ATV signal, at a transmission port, a video signal and audio signal are encoded respectively in a video encoder 11 and audio encoder 12 and reconstructed in packets suitable for transport through packetizers 13 and 14, thereby forming a video packetized elementary stream (PES) and audio PES. They are formed into program stream (PS) signal and transport stream (TS) signal through PS multiplexer 15 and TS multiplexer 16.

Figure 4A:
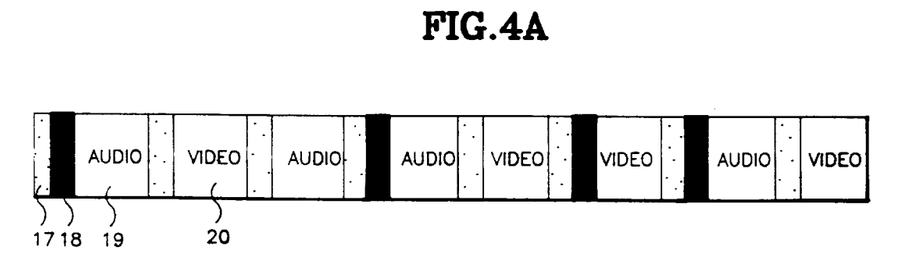
FIG. 4A illustrates a format of a TS signal.

Here, in TS multiplexer 16, the TS signal is formed by re-dividing and packetizing the video and audio PESs in predetermined units suitable for transport, as shown in FIG. 4A. By doing so, a transport heater 17 and PES header 18 are loaded at the beginning of respective packets composed of encoded audio and video signals. The packets are re-modulated for use in transport and transmitted as an ATV signal.

Figure 4B:
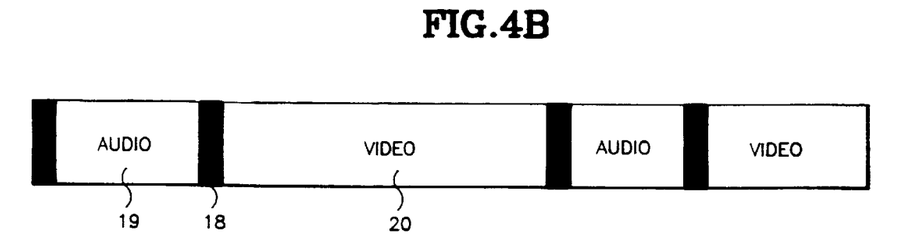
FIG. 4B illustrates a format of a PS signal.

In PS multiplexer 15, the PS signal is formed by multiplexing the video and audio PESs, as shown in FIG. 4B. The PS signal is used loading only PES header 18.

The transported ATV signal is converted to the TS signal which is a packet of 188 bytes and has 19.3 Mbps in data rate. However, since the transport rate of a signal to be recorded is smaller than 24.95 Mbps which is the video recording rate of standard definition (SD)-DVCR of ¼", there is a room above 5 Mbps even after the transported ATV signal is recorded. For easy variable-speed playback of VCR, this enables only I-frame data used as trick play data to be recorded on the room.

After the TS signal converting step, the converted TS signal is temporarily stored and delayed as normal play data in step 2. In step 3, trick play data is detected from the TS signal.

Figure 5:
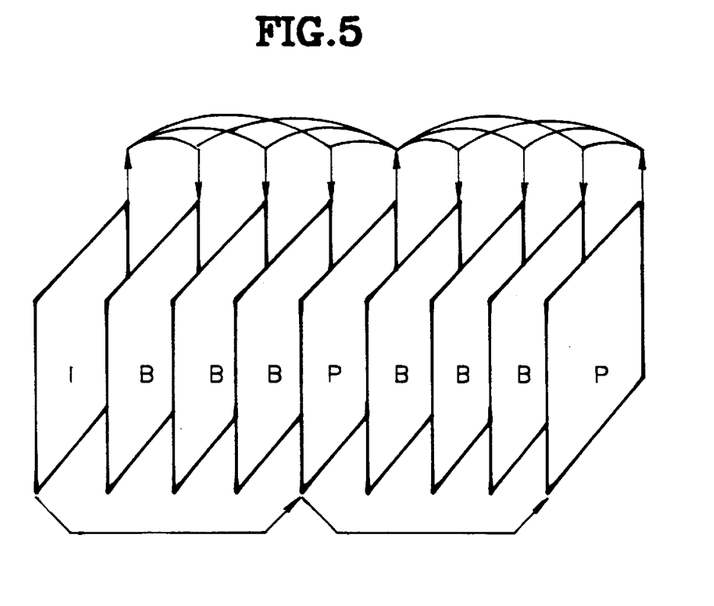
FIG. 5 is a frame diagram of the ATV signal.

Since a method of removing inter-frame redundancy is used in compressing image, the transported ATV signal is divided into I-frame I, P-frame P, and B-frame B according to compressed data as shown in FIG. 5.

I-frame I uses a compression method in a frame not an intra-frame compression method, and uses a method of compressing spatial redundancy only with discrete cosine transform (DCT) and variable length coding (VLC).

P-frame P uses a compression method using previous frame of data. In order to increase compression rate and remove temporal redundancy between pictures, the P-frame uses a method of compressing the present frame by using the previous frame. Here, as the difference information between the previous frame and present frame, motion vector is used.

B-frame B uses a compression method using the previous frame and future frame, and uses bidirectional frame of I-frame I and P-frame P or P-frame P and P-frame P.

B-frame B and P-frame P, not I-frame I, can form the present frame when the previous and future data are precisely reconstructed. They are not appropriate for trick play data. I-frame can be reconstructed regardless of the previous and future frames and is suitable for trick play data for variable-speed playback.

Step 3 for detecting trick play data is explained in detail as follows.

First, the converted TS signal is system-decoded and its transport header is removed so that the signal is converted into a video stream. A start code is separated from the PES header of the converted video stream. Since the property of frame is shown in the respective headers, the header is separated from the start code so that only I-frame data used as trick play data is detected and stored.

To perform step 2 of storing normal data simultaneously with step 3 of detecting trick play data is to perform delay for a time required to detect trick play data.

In step 4, the trick play data by step 2 and normal play data by step 3 are separately recorded in predetermined units.

Figure 6:
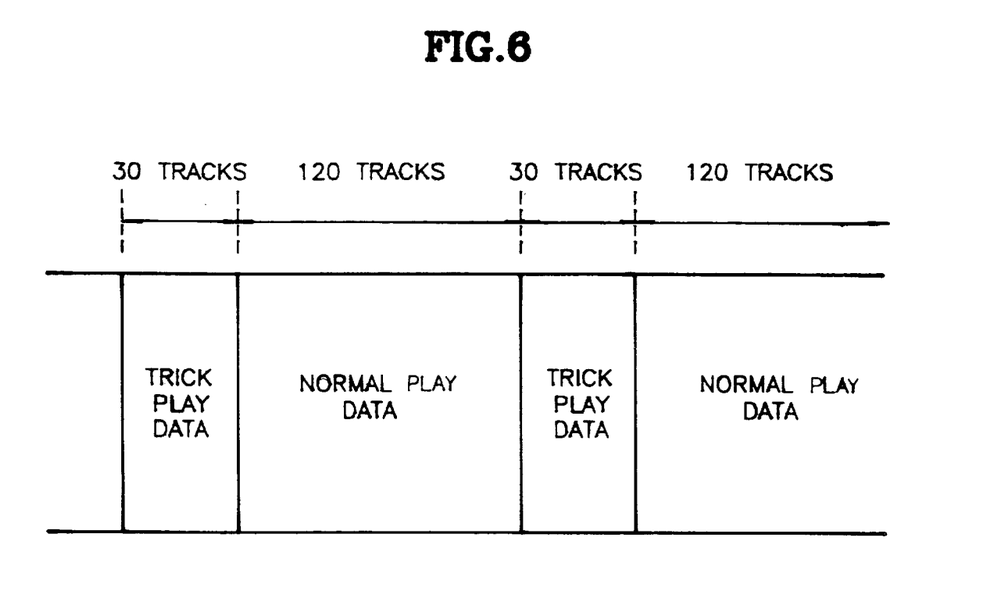
FIG. 6 illustrates a state of data recorded on a track according to the present invention.

As shown in FIG. 6, the trick play data is recorded in the length of 30 tracks, whereas the normal play data is recorded in the length of 120 tracks. The trick play data and normal play data are alternately recorded. In other words, since trick play tracks for trick play data are 30 and normal play tracks for normal play data are 120, 30 tracks of trick play data and 120 tracks of normal play data appear alternately.

Figure 7:
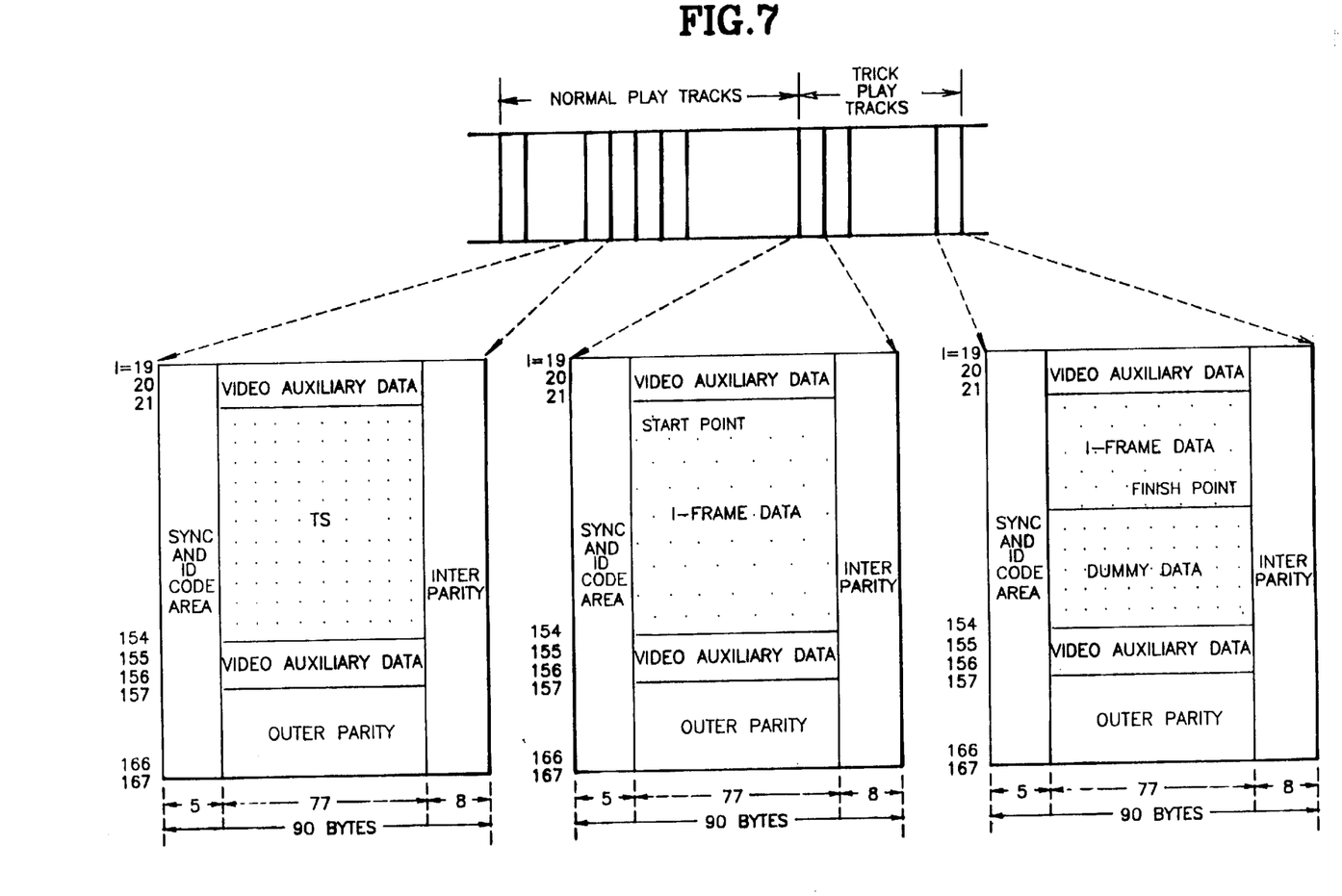
FIG. 7 is a diagram of tape according to the present invention.

The state in which the trick play data and normal play data are recorded will be described with reference to FIG. 7.

The track location where data for image playback is recorded falls from 16 lines to 167 lines which are made up of 90 bytes. The track is divided into a video data storing area where pure data for image playback is recorded, an area where data sync and ID code are recorded, an area where video auxiliary data is recorded, and an area where inner parity and outer parity are recorded.

In a normal play track where normal play data of TS signal is recorded, TS signals are serially recorded.

In a trick play track where trick play data is recorded, trick play data of I-frame data is recorded. The trick play track starts from the beginning of the trick play data, i.e., the beginning of I-frame data. In other words, the beginning of the I-frame data is recorded at the start of the trick play track.

Here, the trick play data is recorded only as much as the amount corresponding to the length of the trick play track where the trick play data is recorded. According to the amount of the trick play data, the trick play track where the trick play data is recorded is insufficient or enough.

There are cases when the amount of trick play data is greater or smaller than the amount corresponding to the length of the trick play trick. In the case when the amount of the trick play data is smaller than the length of the trick play track corresponding to 30 tracks, dummy data is recorded on the left tracks to fill the empty area. In the case when the trick play data is greater than the length of the trick play track corresponding to 30 tracks, in other words, when overflow is produced, left trick play data is removed and not recorded.

After the trick play data and normal play data are recorded, steps and 6 detect if a trick play signal is input or not, and if input, read and reproduce only trick play data recorded according to a corresponding speed.

Specifically, steps 5 and 6 of trick play comprise a step of, if the trick play signal is input, skipping trick play data and normal play data recorded according to a corresponding speed and a step of reading and reproducing only corresponding trick play data out of the trick play data recorded according to the corresponding speed. The steps 5 and 6 will be described with reference to FIGS. 8A and 8B.

Figure 8A:
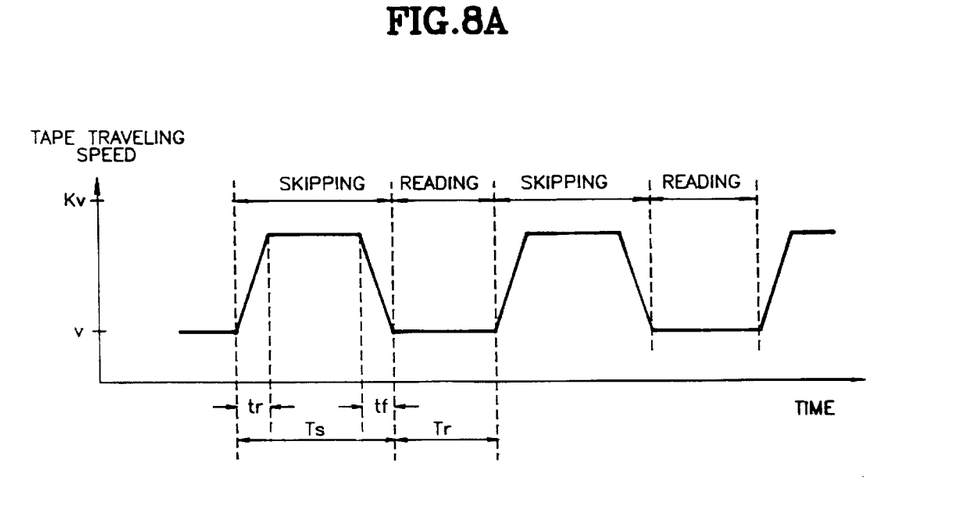
FIG. 8A indicates traveling speeds of tape in forward variable-speed playback according to the present invention.

In order to perform forward trick play, as shown in FIG. 8, skipping and reading are repeated so that an average speed becomes different from a normal speed. This will de explained in detail.

Suppose that the traveling speed of tape in normal play V, the speed multiple number in skipping is K, the time of skipping track is Ts, the time when the traveling speed of tape is raised in skipping is tr, the time when the traveling speed of tape falls in skipping is tf, the time of reading a track is Tr, the entire traveling distance of tape in skipping and reading is L, and the time of trick play is TN, the number n of variable speed is given $$n = TN/(Ts+Tr) \ldots \qquad \text{equation (1)}$$

Time TN of trick play is given $$TN = L/V$$
$$= (KVTs - (K-1)V(tr+tf)/2 + VTr)/V$$

Then, time TN of trick play can be $$TN = KTs - (k-1)(tr+tf)/2 + Tr \ldots \qquad \text{equation (2)}$$

If time tr when the traveling speed of tape is raised in skipping and time tf when the traveling speed of tape falls in skipping are given 50 ms, and the speed is two-fold, a step in which 120 tracks of normal play track are skipped and 30 tracks of trick play track are read is repeated. In other words, since time TN of 150 tracks is 500 ms in normal play and time tr of reading 30 tracks is 100 ms in trick play, if these factors are substituted in equation (1), time Ts of skipping a track is 150 ms. If this result is substituted in equation (2), the speed multiple number K is 3.5. In skipping, if 120 tracks of normal play tracks are skipped at 3.5-fold speed, trick play is performed at two-fold speed.

In other words, in the case of two-fold play, 120 tracks where normal play data is recorded are skipped and 30 tracks where trick play data is recorded are read and reproduced.

If time tr when the traveling speed of tape is raised in skipping and time tf when the traveling speed of tape falls in skipping are 50 ms, and the speed is eight-fold speed, a step where 570 tracks of normal play tracks and trick play tracks are skipped and 30 tracks of trick play tracks are read is repeated.

In other words, since time TN of 600 tracks is 2000 ms in normal play and time tr of reading 30 tracks is 100 ms in trick play, if these factors are substituted in equation (1), time Ts of skipping a track is 150 ms. If this result is substituted in equation (2), the speed multiple number K is 18.5. In skipping, if 570 tracks of normal play tracks are skipped at 18.5-fold speed, trick play is performed at eight-fold speed.

In the case of eight-fold play, 570 tracks where normal play data and trick play data are recorded are skipped and 30 tracks where trick play data is recorded are read and reproduced.

Figure 8B:
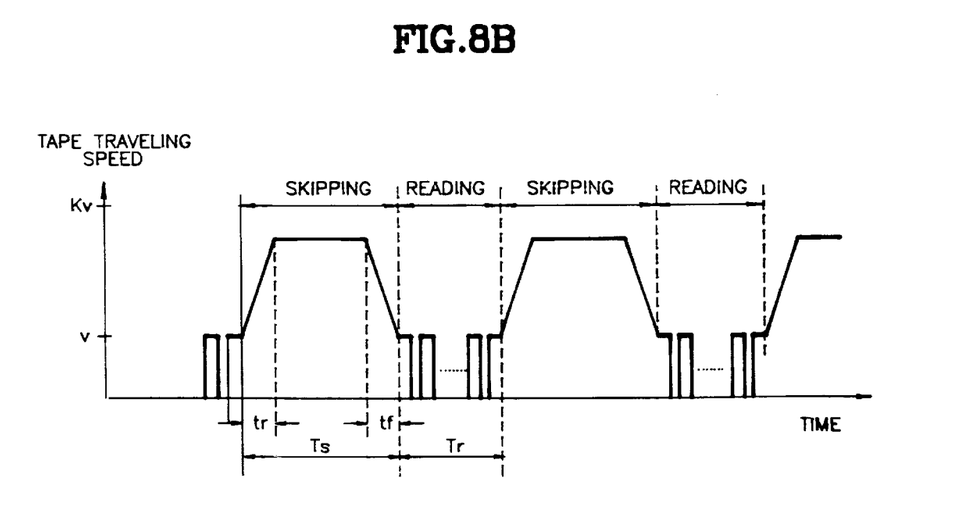
FIG. 8B indicates traveling speeds of tape in reverse variable-speed playback according to one embodiment of the present invention.

For the reverse trick play, similar to the forward trick play, as shown in FIG. 8B, skipping and reading are repeated so that the average speed becomes different from the normal speed. Since the traveling direction of tape is opposite that of the forward direction, the traveling speed of tape is—. Except this, other conditions are the same as in the forward direction. In other words, in the case when the trick play is reversely performed, corresponding trick play data out of recorded trick play data is read and reproduced at a reversed normal speed and returns to a reverse high speed.

In another embodiment of reverse trick play, if a reverse trick play signal is input, a head drum is reversely rotated with a capstan so that a reverse skipping and reverse reading are performed similar to the forward trick play. This step will be described with reference to FIG. 9.

Figure 9:
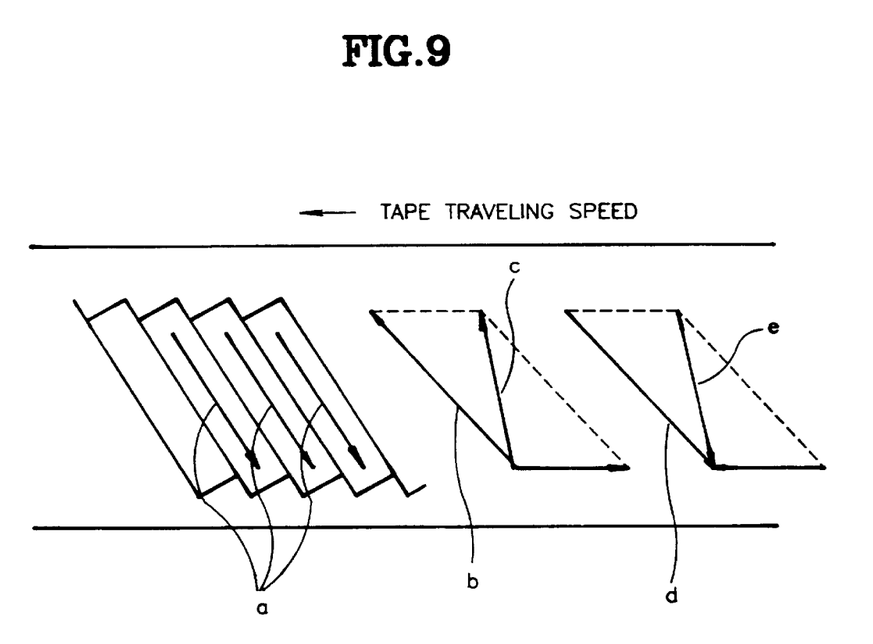
FIG. 9 illustrates a traveling speed of tape in reverse variable-speed playback according to another embodiment of the present invention.

In the case when the head drum and capstan are rotated at the normal speed in the forward direction, the head traces the track as (b). In the case when the head drum and capstan operate in skipping, the head traces the track as (c).

In the case when the head drum and capstan operate reversely, the head traces the track as (a). In the case when the head drum and capstan operate reversely at the normal speed, the head traces the track as (d). In the case when the head drum and capstan operate reversely and in skipping, the head traces the track as (e).

When the head reads out the data recorded on the tracks and data stream in opposite direction to that of the data recorded on the tracks is created, this data is stored in a trick play buffer and read in the opposite direction to read out the original data stream. By doing so, the reverse trick play is performed similar to the forward trick play.

In the case of reverse trick play, corresponding trick play data out of the recorded trick play data is read out in the reverse direction and stored. The stored data is re-read out reversely and reproduced.

In steps 7 and 8, after the trick play data and normal play data are recorded, if the trick play signal is not input, it is detected whether a normal play signal is input or not. If the normal play signal is input, only the recorded normal play data is read out and reproduced.

Figure 10:
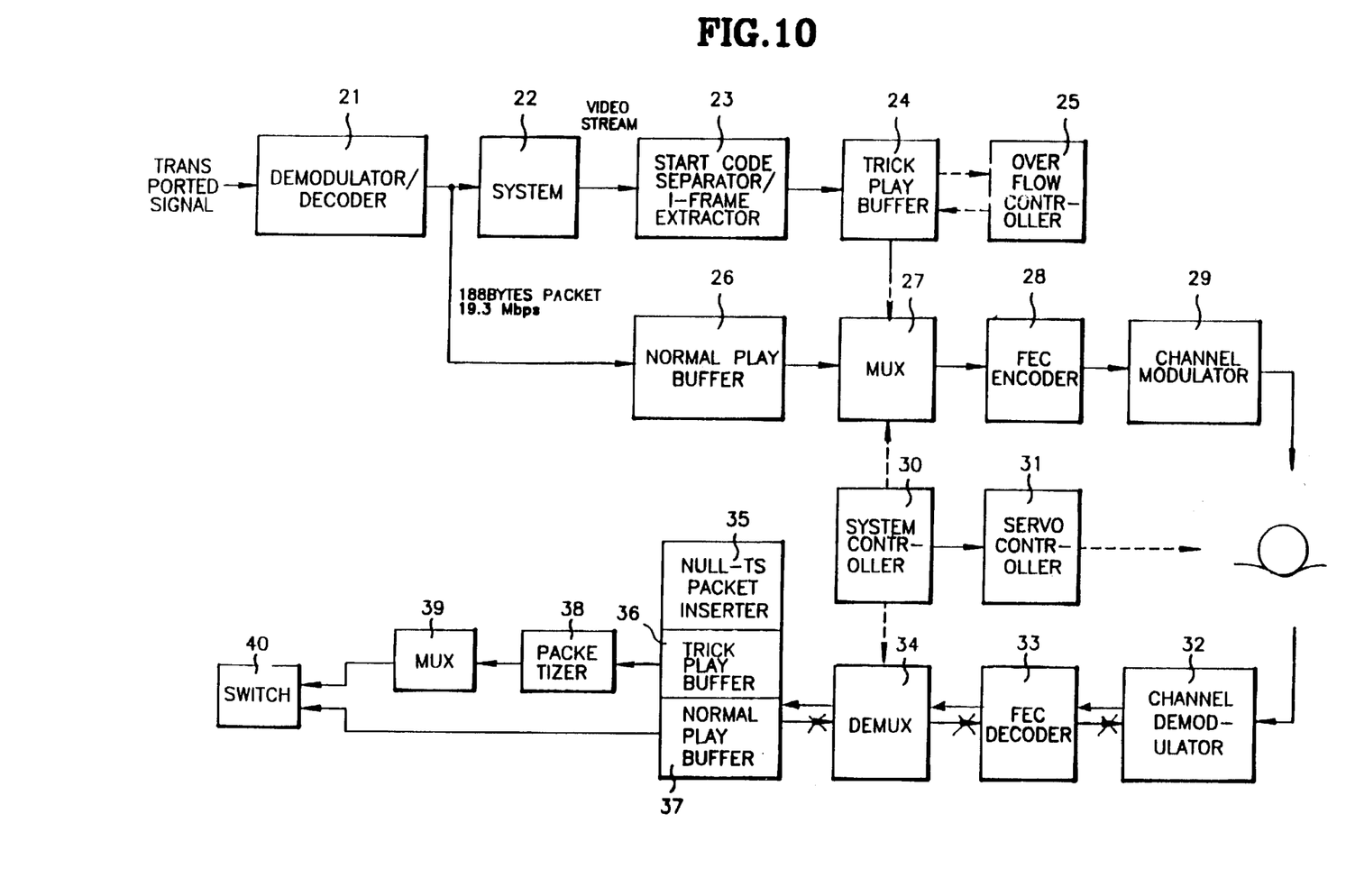
FIG. 10 is a block diagram of a circuit employed in the present invention.

The process of trick play by DVCR is carried out with the hardware shown in FIG. 10 and described in detail as follows.

In modulator/forward error correction (FEC) decoder 21, a transported ATV signal is demodulated and its errors inserted during transport are removed to thereby extract a TS signal prior to modulation at a transport port.

The transport header of the TS signal having the bandwidth of 19.3 Mbps, output from modulator/decoder 21 and made up of packets of 188 bytes, is removed in system decoder 22 and converted into a video stream. The start code of the signal is separated in start code separator/I-frame extractor 23 to thereby extract an I-frame. The extracted I-frame for trick play is temporarily stored in trick play buffer 24.

The TS signal having the bandwidth of 19.3 Mbps, output from modulator/decoder 21 and made up of packets of 188 bytes, is recorded for normal play. To conform the time delayed in extracting the I-frame for trick play, the signal is temporarily stored in normal play buffer 26.

Trick play data and normal play data stored in trick play buffer 24 and normal play buffer 26 are output through multiplexer 27 under the control of system controller 30. The data output from multiplexer 27 is FEC-encoded in FEC encoder 28, channel-modulated in channel modulator 29, and then recorded on tape via a channel. Here, system controller 30 controls servo controller 31 to facilitate recording.

The I-frame for trick play should be recorded only on 30 tracks of trick play tracks. This is controlled by overflow controller 25. If the I-frame data is greater than the amount of 30 tracks and creates overflow, excessive data is removed. If the I-frame data is smaller than the amount of 30 tracks, dummy data is filled therein.

In the case when the recorded data is reproduced, the data read out from tape is channel-demodulated in channel demodulator 32 and FEC-decoded in FEC decoder 33. Then, the decoded data is output to demultiplexer 34. Data output from FEC decoder 33 is demultiplexed under the control of system controller 30 and divided into trick play data and normal play data. The data is stored respectively in trick play buffer 36 and normal play buffer 37. The data stored in trick play buffer 36 and normal play buffer 37 is output to switch 40 under the control of system controller. Here, in normal play, only the normal play data stored in normal play buffer 37 is output to switch 40 under the control of system controller 30.

In trick play, the trick play data and normal play data are demultiplexed through demultiplexer 34 according to reading and skipping. In reading, the data output from FEC decoder 33 is demultiplexed and stored to trick play buffer 36 by demultiplexer 34. In skipping, the data output from FEC decoder 33 is demultiplexed and stored in normal play buffer 37 by demultiplexer 34. The trick play data stored in trick play buffer 36 is re-packetized in packetizer 38 and transported and reproduced through multiplexer 39 and switch 40 under the control of system controller 30.

In skipping, however, in order to transport data in 19.3 Mbps, a null-TS packet corresponding to null data is output from null-TS inserter 35. Under the control of system controller 30, in reading, multiplexer 39 selects the trick play data output from trick play buffer 36 and outputs the selected data to switch 40. In skipping, the null-TS packet output from null-TS inserter 35 is selected and output to switch 40.

As described above, the present invention overcomes the difficulty in data format and head tracking to thereby facilitate trick play by DVCR.

What is claimed is:

1. A variable-speed reproducing method for DVCR comprising the steps of:

(1) converting a transported signal into a transport stream signal;

(2) storing said converted transport stream signal as normal play data;

(3) decoding said transport stream signal;

(4) converting said transport stream signal into a video stream;

(5) separating head information from said converted video stream;

(6) detecting and storing only trick play data by using a start code separated from said head information;

(7) recording the un-converted normal play data obtained in step 2 and the trick play data obtained in step 6 on tape;

(8) selectively skipping the normal play data or the normal and trick play data depending on the rate of trick upon reception of a trick play signal after step 7;

(9) detecting trick play data written on a trick region and converting said detected trick play data to said transport stream signal; and (10) transmitting the converted transport stream signal for playing the trick play data, wherein in eight-fold speed playback, 570 tracks where said normal play data and trick play data are recorded are skipped and 30 tracks where said trick play data is recorded are read and reproduced.

* * * * *